Oct. 23, 1956  H. W. TREVASKIS  2,767,728
FLUID PRESSURE MECHANISMS
Filed Oct. 19, 1954  2 Sheets-Sheet 1

INVENTOR
Henry William Trevaskis
by Benj. T. Rauber
his attorney

Oct. 23, 1956     H. W. TREVASKIS     2,767,728
FLUID PRESSURE MECHANISMS
Filed Oct. 19, 1954     2 Sheets-Sheet 2
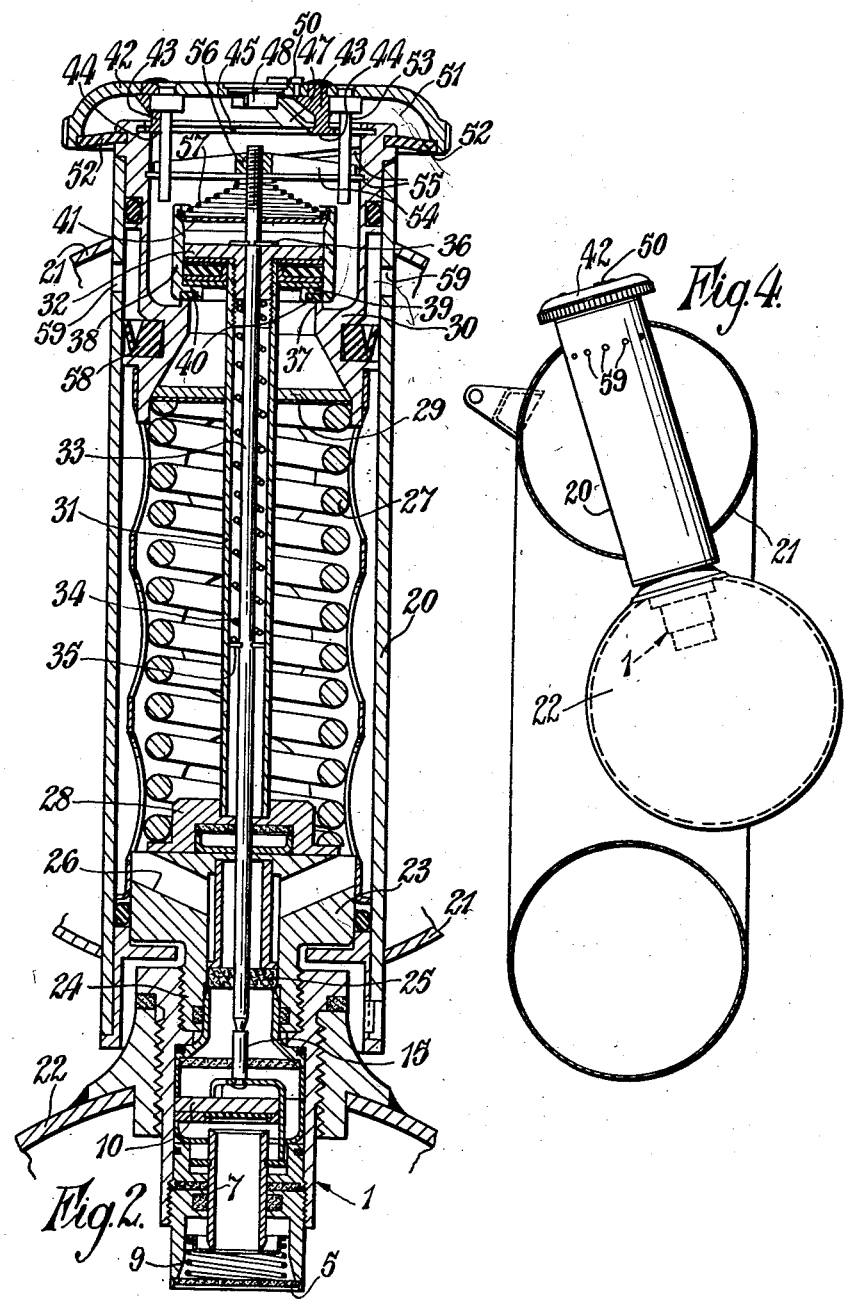
INVENTOR
Henry William Trevaskis
by Benj. T. Rauber
his attorney

United States Patent Office 2,767,728
Patented Oct. 23, 1956

2,767,728

FLUID PRESSURE MECHANISMS

Henry William Trevaskis, Solihull, England, assignor to Dunlop Rubber Company Limited, London County, England, a British company Application October 19, 1954, Serial No. 463,234

Claims priority, application Great Britain October 27, 1953

10 Claims. (Cl. 137—116.3)

My invention relates to fluid pressure mechanisms and more particularly to a valve mechanism which combines the functions of non-return valve, reducing valve and excess pressure relief valve, and is particularly suited to the requirements of military type flame-projecting equipment.

Such a valve mechanism is described in my co-pending application Ser. No. 335,490, filed February 6, 1953, now abandoned. The object of the present invention is to provide an alternative and improved valve mechanism of this nature.

According to my present invention a valve mechanism for the control of fluid pressure comprises a pressure chamber adapted to be connected to a source of fluid pressure, an operating chamber, a spring-loaded normally closed inlet valve in said pressure chamber to control the passage of pressure fluid to the operating chamber, means to connect the operating chamber to a mechanism to be operated or a container to be pressurized, a cylindrical member forming an exhaust valve between the operating chamber and exhaust and lightly spring-urged to seat on an exhaust valve seat, a control rod cooperating with the inlet valve and spring-urged to open said inlet valve, a member restraining movement of the rod to open the inlet valve but allowing free movement in the other direction, means for moving the member to allow the control rod to open the inlet valve, and a piston fluid-tightly slidable in the cylindrical member and movable against a return spring by increase of fluid pressure in the operating chamber, said piston being associated with the control rod whereby the piston on said movement carries the control rod with it and thus allows the inlet valve to close.

Preferably the cylindrical member is provided at one end with an inwardly extending annular flange, one side of which is adapted to seat fluid-tightly on the exhaust valve seat which is of annular form. The internal diameter of the cylindrical member slightly exceeds the internal diameter of the exhaust valve seat so that, with the valve seated, the force exerted by the operating chamber pressure acting in a valve seating direction exceeds that acting in the opposite direction. The exhaust valve is thus more firmly seated as the operating chamber pressure increases.

The restraining member preferably comprises a bridge piece having its ends located in helically-cut grooves and rotatable by a hand knob or the like. The control rod is associated with the bridge piece so that movement of the bridge-piece in one axial direction by rotating said hand-knob in one angular direction moves the spring-urged control rod to open the inlet valve, whilst movement of the hand-knob in the other angular direction and hence movement of the bridge-piece in the other axial direction moves the control rod back again first to allow the inlet valve to close and then to open the exhaust valve.

The flame-projecting equipment comprises a torus, or annular container of circular cross-section, which is adapted to be strapped to the back of an operator and to contain a combustible liquid. Located within the centre of the container is a spherical air bottle for air at high pressure. The air bottle is connected to the container through a valve mechanism to be hereunder described, so that, on operation of the valve mechanism by the operator, air under pressure flows into the container to force the combustible liquid therein through a flexible pipe and out of a jet assembly, where it may be ignited.

The valve mechanism of the present invention is in two parts, and comprises an inlet valve mechanism, and a control and reducing valve mechanism. The inlet valve mechanism is fluid-tightly secured in an aperture in the air bottle and has a screwed part projecting therefrom to which the control and reducing valve mechanism, located in a tube extending radially across the annular fuel container, is secured.

The invention will now be described with reference to the accompanying drawings, of which:

Figure 2 is a sectional view of the valve mechanism of which the inlet valve mechanism of Figure 1 is a part.

Figure 4 is a part-sectional view of a flame-projecting apparatus which incorporates the valve mechanism illustrated in Figures 1, 2 and 3.

Figure 1:
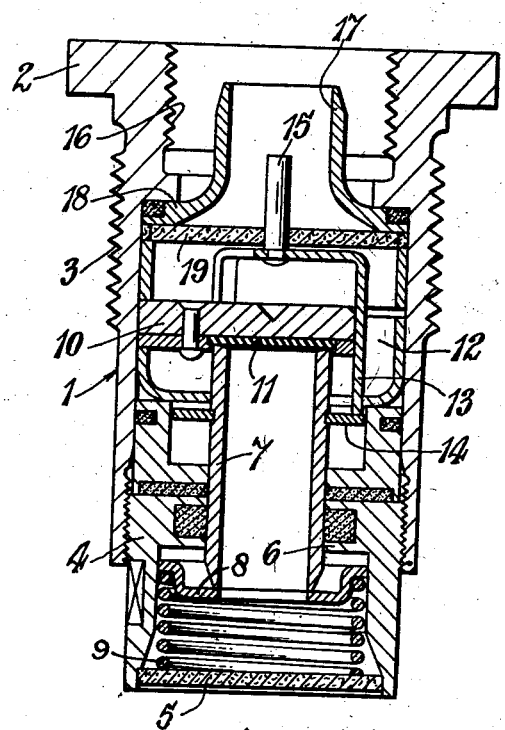
Figure 1 is a sectional view of the inlet valve mechanism of a valve mechanism constructed according to one embodiment of the present invention.

According to one embodiment of the invention the inlet valve mechanism (Figure 1) comprises a cylindrical housing 1 outwardly flanged at one end 2 and threaded 3 intermediate its ends whereby it may be secured in the aperture in e. g. an air bottle, flanged end outermost. Screwed within the end of said cylindrical housing 1 remote from the flanged end 2 is a cylindrical member 4 comprising a pressure chamber, into the outer end of which is clipped a "Porosint" air filter 5. The inner end of the cylindrical member is inwardly flanged at 6 and a tubular valve member 7 is slidably and fluid-tightly fitted through said flange 6. The outer end of the tubular valve member 7 abuts an annular cap 8 slidable in the cylinder member 4 and a light compression spring 9 is fitted between the filter 5 and said cap 8.

A valve block 10 is fitted diametrically across the cylindrical housing at a location intermediate its ends and a resilient valve seat 11 is secured to said block 10 to co-operate with the adjacent end of the tubular valve member 7 which is chamfered to provide a knife-edge seating. The valve block is provided, equispaced around its outer periphery, with three-axially-extending passages 12, through each of which a leg of a tripod 13 extends. Said legs each abut at one end an annular member 14 secured to the outer periphery of the tubular valve member 7, adjacent the valve seat end, and from the junction of the three legs, on the other side of the valve block 10, a pin 15 extends axially towards the flanged end 2 of the cylindrical housing.

The flanged end 2 of the cylindrical housing is internally threaded as shown at 16 and a cylindrical outlet piece 17 having an outwardly flanged end 18 is secured within the housing, the cylindrical portion of the outlet piece 17 being located within the internally threaded end of the housing. A second "Porosint" filter 19 is fitted to this end of the cylindrical housing, the pin 15 projecting through a hole in the centre thereof and extending within the cylindrical portion of the outlet piece.

The end of the tubular valve member 7 comprising the inlet valve is chamfered to provide an annular knife-edge seat at the outer periphery thereof. Since the wall thickness of said member 7 is uniform, the valve member is balanced in the pressure chamber, i. e. the force tending to seat the valve is balanced by the force tending to unseat the valve. The inlet valve is closed by the light compression spring 9 and only a small load on the pin 15 is necessary to open the valve against the spring and a small amount of friction resistance.

The control and reducing valve mechanism to be later described is adapted to fit fluid-tightly into a tube 20 which extends radially across a section of an annular fuel container 21 (Figure 4) and which communicates with the interior thereof. Said mechanism projects from both ends of said tube 20, one end, adjacent the outer periphery of the container 21, comprising a manually-adjustable valve control device and the other end adjacent the inner periphery of the container 21 comprising threaded means whereby the inlet valve mechanism, and hence an air bottle 22, may be secured thereto.

The control and reducing valve mechanism (Figure 2) comprises a tubular member 23, comprising an operating chamber, into one end of which is fitted an inlet valve mechanism of the type described and illustrated in Figure 1, said tubular member having an externally threaded cylindrical part 24 extending therefrom which fluid-tightly co-operates with the cylindrical portion of the outlet piece 17 when the inlet valve mechanism is screwed thereonto, by means of the internally threaded part 16. The inlet valve mechanism communicates through a "Porosint" filter 25 with the interior of the tubular member 23 which is itself provided with holes 26 to allow the passage of compressed air into the tube 20 extending radially across the fuel container 21.

A helically wound main return spring 27 is fitted within the tube 20 one end thereof abutting an end member 28 which is seated on the tubular member 23 and the other end abutting an annular plate 29 which is located against one end of a control valve housing 30 which is secured to the tube 20 at the end remote from the inlet valve mechanism. A further tube 31 has one end secured centrally to the end member 28 and extends axially therefrom through the tube 20 and into the control valve housing 30 and a piston 32 is secured to this end of the tube 31. A control rod 33 extends axially and fluid-tightly through the tubular member 23, the end member 28, then through the tube 31 and the piston 32. One end of said rod 33 is adapted to abut the pin 15 extending axially from the tripod 13 of the inlet valve mechanism and a helically coiled spring 34 is fitted over the rod 33 and within the tube 31, one end thereof abutting the piston 32 and the other end abutting a ring 35 carried by the rod 33 intermediate its ends. A circular abutment 36 carried by the rod 33 is located adjacent the side of the piston 32 remote from the spring 34.

The control valve housing is provided integrally with an annular exhaust valve seat 37 extending axially away from the inlet valve mechanism. A cylindrical member 38 is provided within the control valve housing having an inwardly extending annular flange 39 at one end thereof. The flange 39 is grooved at one side to accommodate a seating ring 40 to co-operate with the exhaust valve seat 37. The internal diameter of the cylindrical member 38 is slightly greater than the internal diameter of the exhaust valve seat 37 and the piston 32 secured to the control rod 33 is fluid-tightly slidable within said cylinder member 38. A circular plate 41 is clipped into the end of the cylindrical member remote from the seating ring 40 and the rod 33 projects through a hole central in said plate 41, the end of the rod being threaded.

A control knob 42, comprising a serrated dished cover, is provided on its concave side with three equispaced pins 43 each having an outwardly-extending annular flange 44 at one end thereof. The adjacent end of the control valve housing is provided with an annular groove 45 in which the flanges 44 of the pins 43 are located, three equispaced cut-outs 46 being provided to allow the flanges to be fitted to the groove 45. The cover 42 is thus rotatably secured to the end of the control valve housing, and is retained thereon by a leaf spring 47 secured at one end to a boss 48 rotatably fitted in the centre of the cover 42 the other end being sprung into a slot in the end of the control valve housing.

Figure 3:
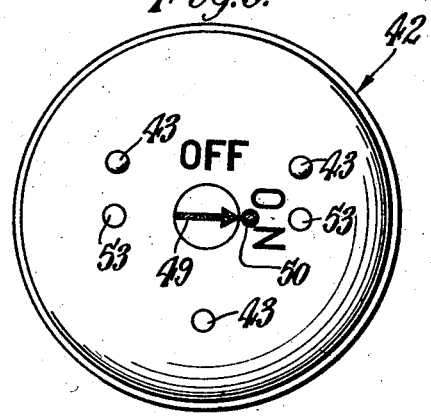
Figure 3 is an end view of the valve mechanism illustrated in Figures 1 and 2.

Means (not shown) are provided for restricting the rotary movement of the control knob 42 to 90° and clicking means (not shown) are also provided to indicate to the operator when the valve is in the "on" or "off" position. The boss 48 rotatable in the cover 42 is provided, on the side remote from the non-rotatable leaf-spring 47, with an arrow 49 (Figure 3) adapted to point to "on" or "off" marked on the cover, and the cover is provided at the "on" position with a shouldered peg 50 which registers with the arrow and enables the operator, when unable to see the cover, to tell by touch whether the valve is off or on.

The edge of the cover 42 is spaced a short distance away from the side of the control valve housing to provide an annular exhaust passage 51. An annular resilient seal 52 is secured at its inner periphery to the control valve housing and its outer periphery abuts the edge of the cover 42, thus allowing the passage of exhaust air from the housing and preventing the passage of foreign matter, water and the like in the opposite direction.

Two diametrically-opposed pegs 53 each have one end secured to the cover 42 and extend axially into the control valve housing. Each peg is axially slidable through a hole adjacent opposite ends of a bridge piece 54 which extends diametrically across said housing, the ends thereof being located in grooves 55 cut helically into the wall of said housing. Rotation of the control knob 42 thus rotates the bridge piece 54 and causes it to move either up or down the control valve housing. The threaded end of the rod 33 slidably extends through a hole central in said bridge piece and a nut 56 is secured to the end of said rod. A light spiral spring 57 is fitted in compression between the bridge piece 54 and the circular plate 41 secured to the end of the cylinder member 38.

An annular seal 58 of substantially V-section is fitted between the control valve housing and the tube 20 into which the mechanism is fitted, said seal 58 allowing the passage of compressed air in one direction only, i. e. from the source to the interior of the annular fuel container through holes 59 in the tube 20.

In the inoperative position of the whole mechanism, i. e. the combined inlet valve and control and reducing valve mechanism, the inlet valve 7 is seated under the action of its compression spring 9, and the end of the pin 15 associated with the inlet valve tripod 13 is spaced a short distance away from the end of the rod 33 of the control valve. The exhaust valve seating ring 40 is lightly spring-loaded on the exhaust valve seat 37, the bridge piece 54 is at the control knob end of the valve housing and this draws the rod 33 with it so that the abutment 36 thereon is adjacent the circular plate 41 of the cylindrical member 38, thus compressing the control rod spring 34 between the piston 32 and the ring 35. The control knob, of course, is in the "off" position.

The complete mechanism operates as follows. Rotation of the control knob 42 from the "off" to the "on" position rotates the bridge piece 54 which, engaging in the helically cut grooves 55, is forced downwardly towards the cylindrical member 38. The spiral spring 57 is compressed and this increases the downward load on the cylindrical member so that the seating ring 40 thereon makes a positive and fluid-tight seating with the exhaust valve seat 37.

As the bridge piece moves downwardly so the control rod 33, under the action of the spring 34 compressed between the piston 32 and the ring 35 secured to the rod, is also forced downwardly until the end thereof first abuts the pin 15 of the inlet valve tripod 13 and then, acting through said tripod, opens the inlet valve 7 against the inlet valve compression spring 9. The abutment 36 on said rod 33 will then be located against the adjacent face of the piston 32. Compressed air from the air bottle 22 thereupon flows through the inlet valve into the tubular member 23. It also flows through the holes 26 in said tubular member into the tube 20 secured radially across the annular fuel container 21 and, deflecting the wall of the V-sectional seal 58, passes through the holes 59 in said tube into the fuel container. Fuel is thus forced through a flexible pipe and out of a jet assembly where it may be ignited.

The pressure in the tubular member 23 mounts up and, acting on the effective area of the piston 32 slidable in the cylindrical member 38, begins to move said piston upwardly against the force of the main return spring 27 located between the end member 28 and the annular plate 29 abutting one end of the control valve housing. The cylindrical member 38 does not move and the exhaust valve seating ring 40 remains seated since the area of the annular flange 39 on said member on which the operating pressure acts downwardly is greater than the area of the flange on which said pressure acts upwardly. The exhaust valve thus seats more firmly with increases of operating pressure. As the piston 32 moves upwardly it takes the abutment 36 on said control rod 33, and hence the rod itself, with it, the threaded end of the rod passing through the hole in the bridge piece, the nut 56 thus moving away from the bridge piece. When the pressure in the tube 20 reaches a value determined by the rating of the main return spring 27, the piston 32, and hence the rod 33, will have moved back sufficiently to allow the inlet valve 7, under the action of its own spring 9, to seat once more, thereby cutting off the pressure supply from the air bottle.

As soon as the operating pressure in the fuel container and in the tube 20 drops, due to use of the flame throwing equipment, then the main return spring 27 moves the piston 32 and rod 33 downwardly again, the rod opening the inlet valve 7 to allow the pressure in the tube 20 to build up to the predetermined value.

It may happen that, due to the effect of heat, or a sticky inlet valve, the pressure in the tube 20 increases beyond the predetermined value. The piston 32 will thus continue upwardly, compressing the main return spring 27 until the abutment 36 on the rod contacts the circular plate 41 at the end of the cylindrical member 38. When this occurs the piston 32 and cylindrical member 38 become integral and thus the upward pressure acting on the area of the piston, combined with the upward pressure acting on the effective area of the exhaust valve will overcome the downward pressure acting in the flange 39 and the spiral spring 57 to lift the cylindrical member, thus unseating the exhaust valve and allowing excess pressure to flow to exhaust. The exhaust valve will then seat once more under the action of the spiral spring.

The valve is rendered inoperative by rotating the control knob 42 to the "off" position. The bridge piece 54 rides up the helical grooves 55 to the top of the control valve housing, carrying the rod 33 with it. Initial movement of said rod allows the spring-loaded inlet valve 7 to close, if not already closed, and further movement of said rod causes the abutment 36 thereon to contact the circular plate 41 of the cylindrical member 38, thus lifting said member 38 and opening the exhaust valve. Pressure thus flows through the control knob to exhaust.

An advantage of constructions in accordance with the present invention is that the inlet valve retains the air in the bottle when not attached to the fuel container. When in use the inlet valve acts as a fluid metering orifice, the air flow being controlled, through the control rod by the opening and closing of the inlet valve.

Valve mechanisms of this nature are not restricted to use with flame throwing equipment but may be used in a variety of fluid pressure operated systems.

Having now described my invention what I claim is:

1. A valve mechanism for the control of fluid pressure comprising a pressure chamber to be connected to a source of fluid pressure, an operating chamber having an exhaust, a spring loaded, normally closed, inlet valve to control the passage of pressure fluid from the pressure chamber to the operating chamber, a one way valve to deliver pressure fluid from the operating chamber, an exhaust valve comprising a valve seat and a cylindrical member between the operating chamber and its exhaust to seat on said valve seat, a spring lightly urging said exhaust valve against said exhaust valve seat, a control rod movable axially to open said inlet valve, a spring to urge said rod in a direction to open said inlet valve, a member restraining movement of the rod to open the inlet valve but allowing free movement of the rod in the other direction, cam means for moving said member to allow the spring urged rod to open the inlet valve, a piston fluid tightly slidable in the cylindrical member of the exhaust valve under the action of pressure in the operating chamber to move said control rod in a direction to allow the inlet valve to close.

2. A valve mechanism according to claim 1 wherein the exhaust valve seat is annular and has an internal diameter less than that of the cylindrical member and the said cylindrical member is provided at one end thereof with a radially inwardly extending annular flange, one side of which is adapted to fluid-tightly engage said exhaust valve seat.

3. A valve mechanism according to claim 2 wherein the restraining means comprises a bridge-piece having the ends thereof located in helically formed grooves, said bridge-piece being adapted to be rotated by a hand knob or the like.

4. A valve mechanism according to claim 3 wherein said control rod extends axially through said bridge piece and a nut or the like secured to said control rod is spring-urged to abut the side of the bridge-piece remote from the exhaust valve.

5. A valve mechanism according to claim 4 wherein a tripod member is interposed between the movable portion of said inlet valve and said control rod to transmit movement of the rod to the said portion.

6. A valve mechanism according to claim 5 wherein the said pressure chamber, inlet valve and tripod member are contained in a separate casing which is readily detachable from the remainder of said valve mechanism.

7. The valve mechanism of claim 1 having a pressure fluid supply container connected to the pressure chamber and a fuel supply chamber connected to the operating chamber to receive pressure fluid supplied therefrom.

8. The valve mechanism of claim 7 in which said pressure chamber is separable from said operating chamber whereby said containers may be separated without loss of fluid pressure.

9. The valve mechanism of claim 1 in which said inlet valve comprises a fixed valve plate, a valve cylinder slidable axially to and from contact with said plate, a plate spring pressed against the end of said cylinder opposite said valve plate and having an opening to said cylinder and a cradle engaging said cylinder to move it against the action of said spring pressed plate to open said valve, said cradle being movable by said control rod.

10. The valve mechanism of claim 1 in which the one way valve comprises an annular resilient ring between the valve seat of the exhaust valve and the wall of the operating chamber and said resilient ring has a V-shaped groove in its face toward the delivery end of the operating chamber.

References Cited in the file of this patent

UNITED STATES PATENTS

| 1,511,318 | Berger | Oct. 14, 1924 |
| 1,593,648 | Berger | July 17, 1926 |
| 2,687,743 | Huber | Aug. 31, 1954 |